(12) United States Patent
Schneider et al.

(10) Patent No.: US 6,619,714 B2
(45) Date of Patent: Sep. 16, 2003

(54) EXPANDABLE ROOM WITH FLAT FLOOR

(75) Inventors: Robert H. Schneider, Beaver Dam, WI (US); Jeffrey N. Ashbeck, Wisconsin Rapids, WI (US)

(73) Assignee: Actuant Corporation, Glendale, WI (US)

( * ) Notice: Subject to any disclaimer, the term of this patent is extended or adjusted under 35 U.S.C. 154(b) by 0 days.

(21) Appl. No.: 10/149,372

(22) PCT Filed: Dec. 8, 2000

(86) PCT No.: PCT/US00/33209

§ 371 (c)(1),
(2), (4) Date: Jun. 5, 2002

(87) PCT Pub. No.: WO01/42042

PCT Pub. Date: Jun. 14, 2001

(65) Prior Publication Data

US 2002/0180232 A1 Dec. 5, 2002

Related U.S. Application Data

(60) Provisional application No. 60/170,048, filed on Dec. 10, 1999.

(51) Int. Cl.[7] .............................. B60P 3/34; B62D 33/08
(52) U.S. Cl. ................................ 296/26.13; 296/26.01; 296/171; 296/175
(58) Field of Search ................................ 296/172, 175, 296/176, 26.12, 26.13, 26.01, 26.03, 26.08, 26.09, 171; 52/67

(56) References Cited

U.S. PATENT DOCUMENTS

| 5,491,933 A | | 2/1996 | Miller et al. ................. 52/67 |
| 5,732,839 A | | 3/1998 | Schimmang et al. ......... 220/1.5 |
| 5,788,306 A | * | 8/1998 | DiBiagio et al. ......... 296/26.02 |
| 5,902,001 A | | 5/1999 | Schneider ................ 296/26.13 |
| 5,984,396 A | | 11/1999 | Schneider ................ 296/26.14 |
| 6,052,952 A | | 4/2000 | Frerichs et al. ................. 52/64 |
| 6,109,683 A | * | 8/2000 | Schneider ..................... 296/171 |
| 6,202,362 B1 | * | 3/2001 | McManus et al. ...... 296/171 X |

FOREIGN PATENT DOCUMENTS

| DE | 44 29 927 A | 11/1995 | .......... B65D/88/12 |
| FR | 1 570 553 A | 6/1969 | |

* cited by examiner

Primary Examiner—D. Glenn Dayoan
Assistant Examiner—Patricia Engle
(74) Attorney, Agent, or Firm—Quarles & Brady LLP (57) ABSTRACT

A slide-out support system (28) for a flat floor slide-out room (12) of a recreational vehicle (10) has ways (40) on both sides of telescoping inner rails (34) which present a pair of downwardly facing ramped surfaces (110) on which rollers (70) roll to support the room (12). Ramped surfaces (56) are provided on opposite sides of stationary outer rails (30) on which rollers (50, 52) mounted to the inner end of the inner rails (34) roll to also help support the room. The ramps (110, 56) are in registration with one another so that during extension and retraction the rails (34) are lowered and raised while maintaining them substantially horizontal. A follower (72) has a roller (76) which rolls on the upper surface (36) of the inner rail (34) and a roller (78) which rolls on the lower surface (80) of the slide-out floor (64) to lower or raise the floor (64) as the rail (34) is lowered or raised while maintaining the floor (64) in a substantially constant horizontal orientation.

17 Claims, 6 Drawing Sheets

EXPANDABLE ROOM WITH FLAT FLOOR

CROSS-REFERENCE TO RELATED APPLICATION

This claims the benefit of U.S. Provisional Patent Application No. 60/170,048 filed Dec. 10, 1999.

STATEMENT CONCERNING FEDERALLY SPONSORED RESEARCH OR DEVELOPMENT

Not applicable.

BACKGROUND OF THE INVENTION

1. Field of the Invention

This invention relates to slide-out support systems for recreational vehicles ("RVs") such as trailers and motor homes and in particular to a slide-out support system which positions the floor of the slide-out room at approximately the same elevation as the floor of the stationary part of the RV.

2. Discussion of the Prior Art

In slide-out rooms of RVs, the simplest systems position the floor of the slide-out room a small step above the floor of the stationary portion of the vehicle. More complex systems, known as "flat floor" systems, have means for positioning the upper surface of the floor of the slide-out room at approximately the same elevation as the upper surface of the floor of the stationary part of the vehicle, from which the room is extended. The present invention relates to the types of systems in which the floor of the slide-out room is approximately level with the floor of the stationary room of the vehicle.

In the prior art, many flat floor slide-out support systems required tipping of the slide-out room as it was being extended in order to bring the floor to the level of the stationary room, and also tipping back when the room was retracted. The tipping required relative movement between the room and the slide-out rails, and angular changes in orientation relative to the stationary portion of the RV, so that either the tipping was difficult to control or complicated mechanisms were required. Other flat floor systems resulted in the floor remaining generally flat or horizontal as it was lowered to the level of the floor of the stationary room, but the mechanisms of these were generally complex or trouble prone.

SUMMARY OF THE INVENTION

The present invention provides a slide-out support system which lowers the slide-out room while maintaining the floor of the slide-out room generally in the same orientation relative to the stationary floor, i.e. generally flat and horizontal, as the floor is lowered to the level of the stationary floor.

The invention acccomplishes this by an improvement in which, with the room in the extended position, the system includes at least one downwardly facing ramped surface adjacent an inner end of the rail and another downwardly facing ramped surface spaced toward the outer end of the rail from the one ramped surface. The drive system is connected to each said rail to extend and retract the rail and rollers roll on the ramped surfaces to support each rail. Both of the ramped surfaces are ramped in a direction and positioned so as to lower each rail as the rollers roll on the ramped surfaces while maintaining a generally horizontal orientation of each rail as the rail is extended and to raise each rail while maintaining a generally horizontal orientation of the rail as the rail is retracted.

In a preferred form, the ramped surfaces are adjacent to one or both sides of the rail, and one ramped surface is stationary and the other ramped surface is fixed to the rail so as to move with the rail. A pair of ramped surfaces may be provided on opposite sides of the rail at an outer end of the rail and another pair of ramped surfaces may be provided on opposite sides of the rail spaced from the one pair of ramped surfaces toward the outer end of the rail, with rollers rolling on all of the ramped surfaces to support the rail generally horizontal as the rail is lowered as it is extended and raised as the rail is retracted.

To maintain the floor of the room in a substantially horizontal orientation as it is extended and lowered or retracted and raised, a follower is positioned between an upper surface of the rail and the floor of the moveable room. The follower maintains a constant spacing between the upper surface and the floor so as to maintain the orientation of the floor as the floor is lowered during extension and raised during retraction. The follower may have one roller which rolls on the inner rail surface and another roller which rolls on the bottom of the floor to accomplish this objective. This reduces scuffing of the stationary floor since contact between the bottom of the slide-out floor and top of the stationary floor is eliminated or minimized, helps establish and maintain the seals between the slide-out room and stationary portion of the RV, and provides smooth, controlled and orderly transitions between extension and retraction of the slide-out room.

In another preferred aspect, the drive system is a rack and pinion drive system which drives an elongated member which is pivotally connected to the rail. Thereby, a rack and pinion drive system may be used to operate the drive system, even though the inner rail maintains its orientation as it is lowered and raised during extension and retraction.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
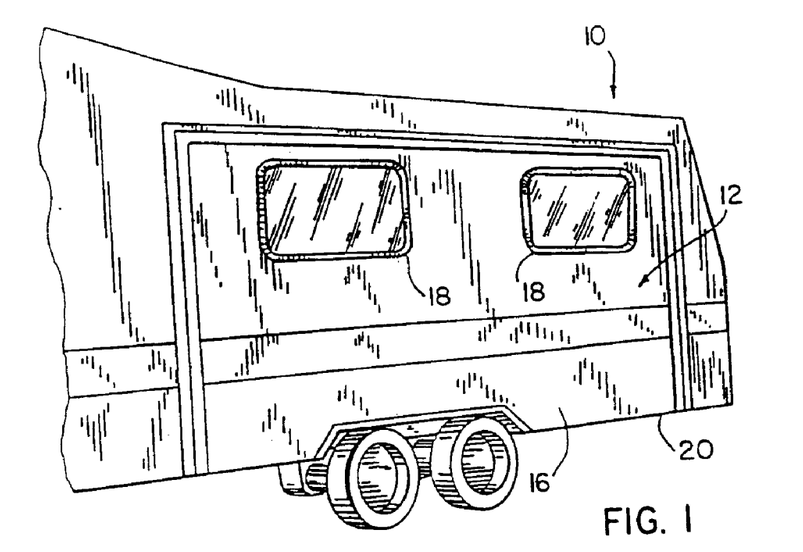
FIG. 1 is a perspective view of a vehicle with its slide-out room retracted.

FIG. 1 illustrates the side of a RV 10 with its slide-out room 12 retracted. The slide-out room 12 has windows 18, an outer wall 16, and an outer bottom edge 20.

Figure 2:
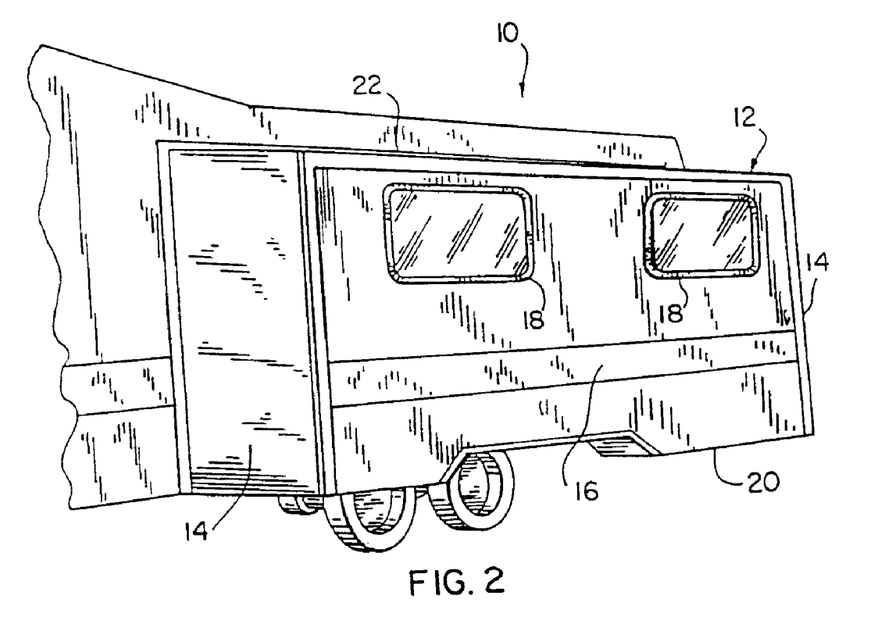
FIG. 2 is a perspective view of the vehicle with its slide-out room extended.

FIG. 2 illustrates the RV 10 with the slide-out room 12 extended. As illustrated, the slide-out room 12 also has end walls 14 and a top wall 22. Slide-out rooms in general are well-known in the art and are used to expand the interior volume of the RV. As is well-known, weatherproof seals are provided between the end walls 14 and the top wall 22 and the side wall of the RV, as well as sometimes between the floor 64 (FIG. 4) of the slide-out room and the stationary floor 66 (FIG. 4) of the RV to prevent wind, rain, dirt, and insects from entering the RV.

Figure 3:
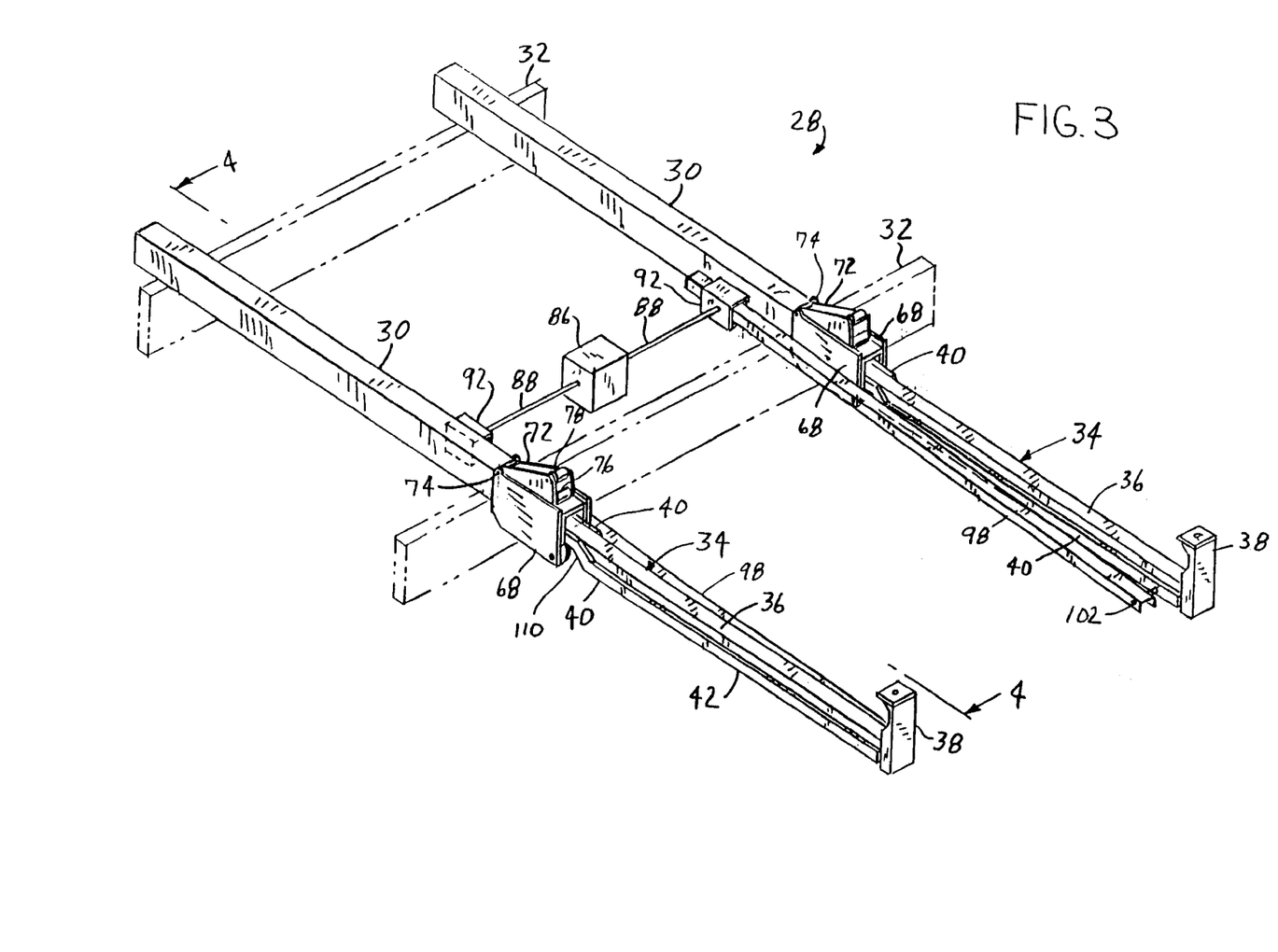
FIG. 3 is a perspective view of a slide-out system of the invention shown in a fully extended position.

FIG. 3 illustrates a slide-out support system 28 of the invention, which is mounted to the frame of the RV under the slide-out room 12. Outer rails 30 of the system are welded or otherwise fixedly attached to beams 32 of the frame of the RV. The frame members 32 run longitudinally relative to the RV, so that the rails 34 extend and retract laterally, in the same direction that the slide-out room 12 extends and retracts. Outer rails 30 are upside-down U-shaped channels which are generally open at the bottom. In the preferred embodiment, the outer rails 30 are open at the bottom for much of their length.

Square or rectangular tubular inner rails 34, which in the preferred embodiment are closed on all four sides, are telescopically arranged inside the outer rails 30 and each has a flat upper surface 36. An attachment member 38 is welded or otherwise attached to the outer end of each inner rail 34 so as to be carried with the inner rail 34 as the rail 34 is extended and retracted. Each attachment member 38 is fixed to the floor 64 of the slide-out room 12 (FIG. 4), or it may be affixed to a frame member of the slide-out room 12 or other component which is fixed relative to the floor of the slide-out 12.

A track, or way, 40 is welded or otherwise securely attached to each side surface of each inner rail 34. Each way 40 presents a downwardly facing lower surface 42 and the lower surfaces 42 of all the ways 40 are in longitudinal (relative to the RV) registration with one another. In other words, all of the ways 40 are aligned so that a longitudinal (relative to the RV) line, will intersect each lower surface 42 of all four ways 40 at the same point along the length of each lower surface 42.

Figure 10:
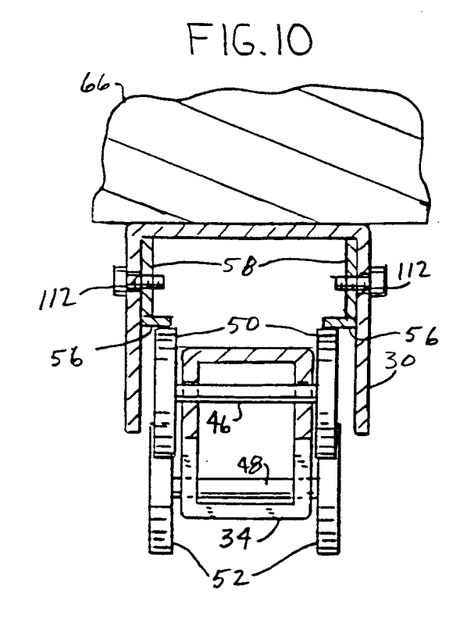
FIG. 10 is a cross-sectional view from the plane of the line 10—10 of FIG. 6.
Figure 11:
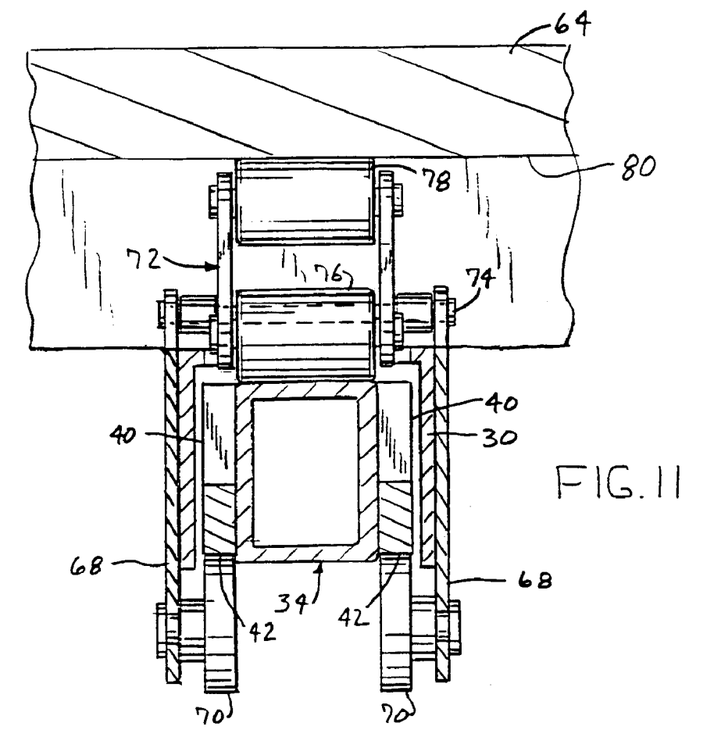
FIG. 11 is a cross-sectional view from the plane of the line 11—11 of FIG. 5.
Figure 12:
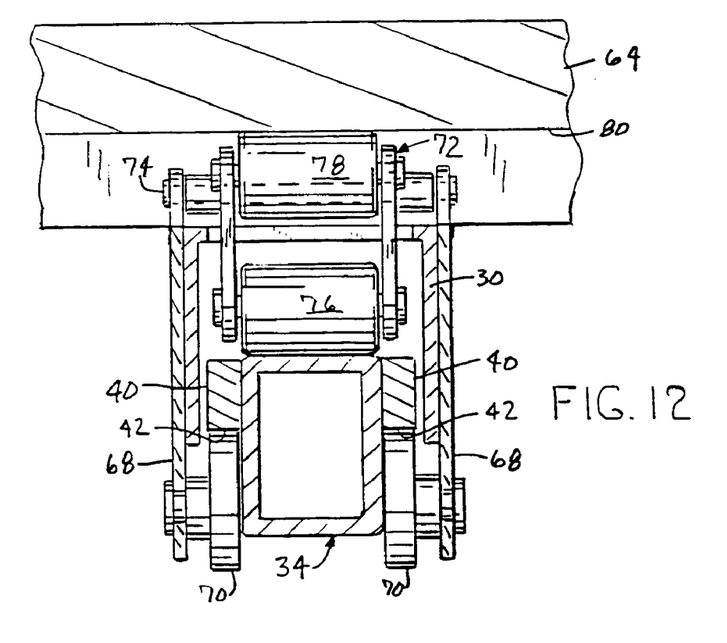
FIG. 12 is a cross-sectional view from the plane of the line 12—12 of FIG. 6.

At the inner end of each inner rail 34, the inner rail 34 mounts a pair of axles 46 and 48 which can rotate relative to the inner rail 34 and which mount, outside of the inner rail 34 at each end, a roller 50, by the axle 46, or a roller 52, by the axle 48. The rollers 50 and rollers 52 provide low friction running of the inner end of the inner rail 34 against the guide surfaces of the outer rail 30 including, in the case of the rollers 50, against the underside of the top wall 54 of the outer rail 30, and, in the case of both sets of rollers 50 and 52, against ramped surfaces 56 provided on the underside of ways 58 which are bolted by bolts 112 (FIG. 10) or otherwise affixed to the inside of the side walls of the outer rails 30. Rollers 52 provide for relatively friction-free running against the belly pans 60 which are welded to each outer rail 30 so as to support the inner end of the inner rail 34 when the room is retracted. Belly pans 60 each have an angled lip 62 which provides a lead-in surface for the rollers 52 to engage when the room is being retracted.

Figure 4:
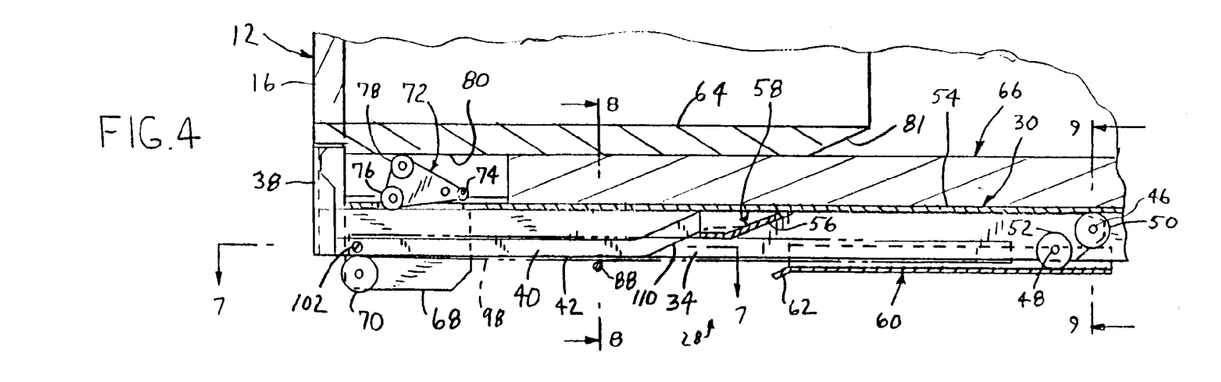
FIG. 4 is a fragmentary side cross-sectional view of the system of FIG. 3 installed in a RV from the plane of the line 4—4 of FIG. 3.
Figure 5:
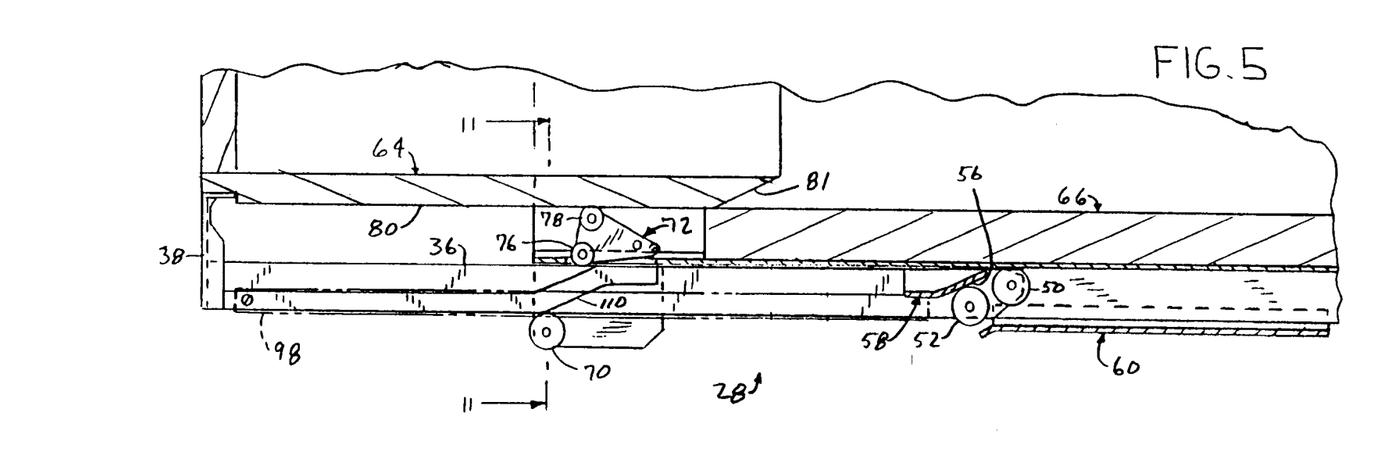
FIG. 5 is similar to FIG. 4, but with the system shown approaching full extension.
Figure 6:
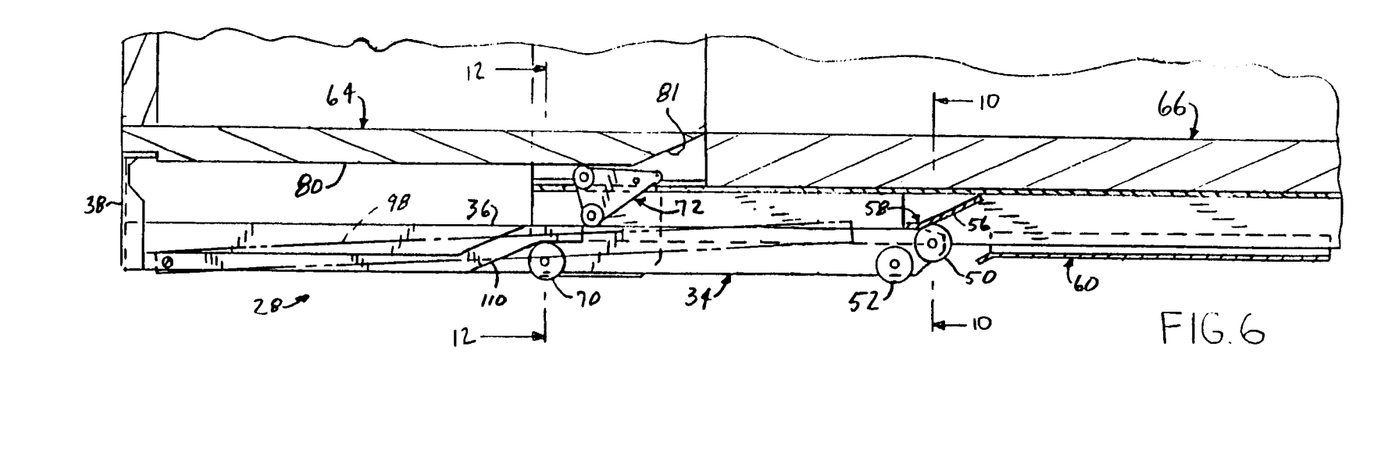
FIG. 6 is similar to FIG. 5, but with the system illustrated fully extended.
Figure 7:
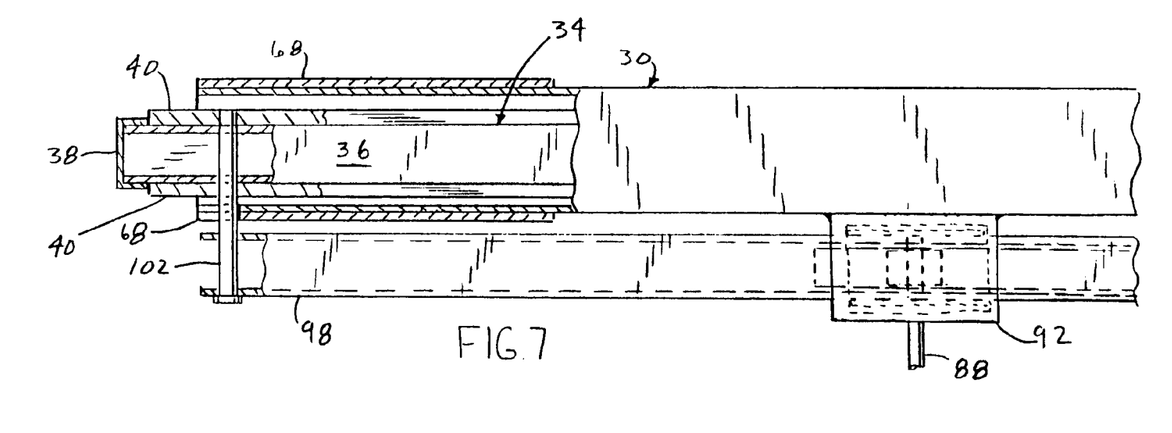
FIG. 7 is a cross-sectional view from the plane of the line 7—7 of FIG. 4.

Referring particularly to FIGS. 4, 5 and 6, the room 12 is illustrated with its floor 64 affixed to the attachment members 38. Side plates 68 are welded or otherwise fixedly attached to the opposite side surfaces of the outer rail 30, adjacent to the outer end of each outer rail 30, and extend both above and below the outer rail 30. Each plate 68 rotatably mounts a roller 70 which engages the lower surface 42 of the adjacent way 40. The support provided by the rollers 70 together with the reaction forces born by the rollers 50 is what supports the attachment members 36 to support the outer end of the slide-out room 12 when it is extended.

Each set of plates 68 also pivotally mount a follower 72 which is pivotally connected to the plates 68 by a pin 74. The top wall of each outer rail 30 is open beneath the follower 72 and the follower 72 rotatably mounts a lower roller 76 and an upper roller 78. The lower roller 76 rolls against the flat upper surface 36 of the corresponding inner rail 34, and the upper roller 78 rolls against the lower surface 80 of the floor 64 of the slide-out room so as to support the inner end of the floor 64 and slide-out room 12, when the room is extended. The combination of the members 38 and follower 72 also support the movable floor 64 over the stationary floor during retraction and extension, to relieve most, if not all, of the weight of the room 12 from the stationary floor 66, thereby reducing scuffing of the stationary floor 66. The follower 72 need not necessarily be pivoted, but could slide in tracks or other means so as to translate the vertical motion of the inner rail 34 to the movable floor 64. The main purpose of the belly pans 60 is to hold the inner end of the inner rail 34 closely proximate to the top wall of the outer rail 30 so that it does not bang around during over-the-road travel.

As illustrated, a rack and pinion drive system is used to extend and retract the inner rails 34. Other means, such as hydraulic cylinders, a lead screw arrangement, or a cable and pulley system could be used to extend and retract the inner rails 34 and therefore the slide-out room 12.

Figure 8:
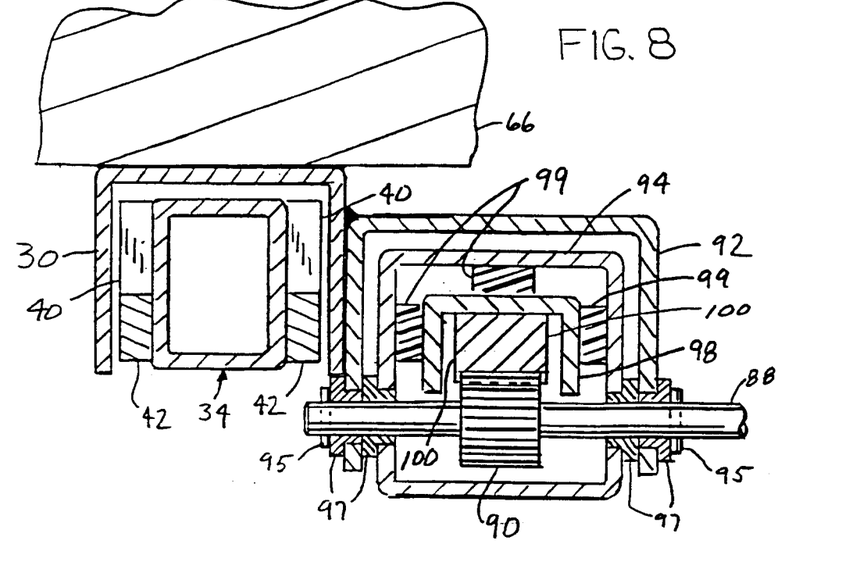
FIG. 8 is a cross-sectional view from the plane of the line 8—8 of FIG. 4, with the drive mechanism (including channel 92 and the parts enclosed thereby or running therethrough) illustrated larger than scale for clarity.
Figure 9:
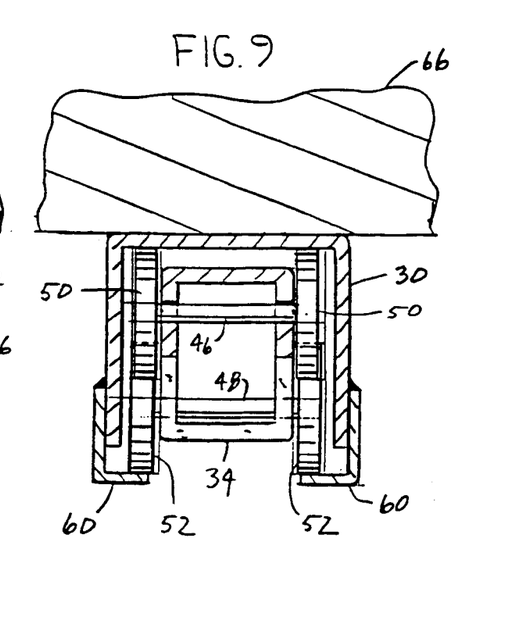
FIG. 9 is a cross-sectional view from the plane of the line 9—9 of FIG. 4.

In the system shown, a centrally mounted motor 86, which is mounted to the frame of the RV, drives a drive shaft 88 which has mounted at each opposite end a pinion gear 90 (FIG. 8). At each end of the drive shaft 88, an upside-down U-shaped member 92 is welded to the side of the adjacent outer rail 30. The drive shaft 88 extends through the sides of the member 92 and/or could extend into the side of the adjacent outer rail 30. The shaft 88 also extends through the sides of a tubular member 94 which is positioned between the sides of the member 92. Pins 95 fix the shaft axially relative to the member 92, but the shaft 88 can rotate relative to them, with bearings 97 provided. Wear strips 99, for example strips of lubricious plastic, such as nylon or Teflon, are provided inside the member 94 to rub against the three sides of U-shaped channel 98 in which is welded gear rack 100. Gear rack 100 meshes with pinion 90 to be driven thereby. The outer end of channel 98 is pivotally connected by a pin 102 to the outer end of the adjacent inner rail 34. Thus, the member 94 pivots with the pivoting of the channel 98 as the room is extended and retracted, and holds the rack 100 engaged with the pinion 90 as the channel 98 slides against the wear strips 99.

As illustrated in FIG. 5, at a partially extended position approaching full extension, the lower surfaces 42 of the ways 40 are upwardly ramped at an upwardly ramped portion 110 so that when the rollers 70 start rolling on the portion 10 during extension, the inner rail 34 will begin to be lowered. So that each rail 34 is maintained substantially horizontal when the roller 70 begins to encounter the ramped surface 110, at the same time the rollers 52 begin to encounter the downwardly ramped surfaces 56 of the ways 58. Upon further extension, the rollers 50 engage the downwardly inclined surfaces 56. Surfaces 56 are at an angle such that they are parallel to the surfaces 110. Thus, the inner rail 34 is maintained substantially parallel to the floor 64, and to the outer rail 30, as full extension is approached.

While the inner rails 34 are being lowered as they approach full extension, parallel to the floor 66 and outer rails 30, the followers 72 are rolling along the upper surfaces of the inner rails 34 and therefore also are lowered. Consequently, the floor 64, and therefore inner end of the room 12, is also lowered at the same rate so as to maintain the room in substantially the same angular orientation relative to the stationary portion of the RV.

In a system of the invention, the room is maintained "square" to the stationary portion of the RV even as it is lowered. This helps to create the seals that are necessary between the slide-out room and the RV in the fully extended position. It also eliminates rapid and erratic changes in the distribution of weight as the room is extended and retracted, which can occur when the room tips relative to the stationary portion of the RV. It also eliminates or reduces scuffing of the stationary floor since the moveable floor is fully or partially supported by the slideout system at all times, and to the extent supported by the system, not supported on the stationary floor.

Although not illustrated, the edge of the stationary floor 66 (FIGS. 4 and 5) could be extended and beveled so that it would be under the beveled edge 81 of the movable floor 64 in the fully extended position of FIG. 6, to help support the beveled edge 81 in the fully extended position.

Upon retraction of the room, the sequence of events is reversed. Rather than being lowered square to the stationary portions of the RV, the room is lifted in a square orientation relative to the RV.

A preferred embodiment of the invention has been described in considerable detail. Many modifications and variations to the preferred embodiment will be apparent to those skilled in the art. Therefore, the invention should not be limited to the scope of the preferred embodiment described.

What is claimed is:

1. In a support system for expanding and retracting a slide-out room of a recreational vehicle, said room having a floor which in an expanded position of the room is at substantially the same level as a stationary floor of the vehicle and in a retracted position of the room is above the stationary floor of the vehicle, said support system including at least one extendable and retractable rail fixed to the room for expanding and retracting the room, rollers for supporting the at least one rail relative to a fixed support and a drive system for moving the at least one rail in and out, the improvement wherein, with said room in said extended position, said system has at least one downwardly facing ramped surface adjacent an inner end of said at least one rail and another downwardly facing ramped surface spaced toward the outer end of said at least one rail from said one ramped surface, wherein said drive system is connected to each said at least one rail to extend and retract said at least one rail and wherein said rollers roll on said ramped surfaces to support each said at least one rail, wherein both of said ramped surfaces are ramped in a direction and positioned so as to lower each said at least one rail as said rollers roll on said ramped surfaces while maintaining a generally horizontal orientation of each said at least one rail as said at least one rail is extended and to raise each said at least one rail while maintaining a generally horizontal orientation of said at least one rail as said at least one rail is retracted, wherein said ramped surfaces are adjacent to sides of said at least one rail.

2. The improvement of claim 1, wherein said one ramped surface is stationary and said other ramped surface is fixed to said at least one rail so as to move with said at least one rail.

3. In a support system for expanding and retracting a slide-out room of a recreational vehicle, said room having a floor which in an expanded position of the room is at substantially the same level as a stationary floor of the vehicle and in a retracted position of the room is above the stationary floor of the vehicle, said support system including at least one extendable and retractable rail fixed to the room for expanding and retracting the room, rollers for supporting the at least one rail relative to a fixed support and a drive system for moving the at least one rail in and out, the improvement wherein, with said room in said extended position, said system has at least one downwardly facing ramped surface adjacent an inner end of said at least one rail and another downwardly facing ramped surface spaced toward the outer end of said at least one rail from said one ramped surface, wherein said drive system is connected to each said at least one rail to extend and retract said at least one rail and wherein said rollers roll on said ramped surfaces to support each said at least one rail, wherein both of said ramped surfaces are ramped in a direction and positioned so as to lower each said at least one rail as said rollers roll on said ramped surfaces while maintaining a generally horizontal orientation of each said at least one rail as said at least one rail is extended and to raise each said at least one rail while maintaining a generally horizontal orientation of said at least one rail as said at least one rail is retracted, wherein one pair of said ramped surfaces are provided on opposite sides of the at least one rail at an inner end of the at least one rail and another pair of said ramped surfaces are provided on opposite sides of the at least one rail spaced from said one pair of ramped surfaces toward said outer end of said at least one rail, with rollers rolling on all of said ramped surfaces to support said at least one rail generally horizontal as said at least one rail is lowered as it is extended and raised as said at least one rail is retracted.

4. In a support system for expanding and retracting a slide-out room of a recreational vehicle, said room having a floor which in an expanded position of the room is at substantially the same level as a stationary floor of the vehicle and in a retracted position of the room is above the stationary floor of the vehicle, said support system including at least one extendable and retractable rail fixed to the room for expanding and retracting the room, rollers for supporting the at least one rail relative to a fixed support and a drive system for moving the at least one rail in and out, the improvement wherein, with said room in said extended position, said system has at least one downwardly facing ramped surface adjacent an inner end of said at least one rail and another downwardly facing ramped surface spaced toward the outer end of said at least one rail from said one ramped surface, wherein said drive system is connected to each said at least one rail to extend and retract said at least one rail and wherein said rollers roll on said ramped surfaces to support each said at least one rail, wherein both of said ramped surfaces are ramped in a direction and positioned so as to lower each said at least one rail as said rollers roll on said ramped surfaces while maintaining a generally horizontal orientation of each said at least one rail as said at least one rail is extended and to raise each said at least one rail while maintaining a generally horizontal orientation of said at least one rail as said at least one rail is retracted, wherein a follower is positioned between an upper surface of said at least one rail and said floor of said moveable room, said follower maintaining a substantially constant spacing between said upper surface and said floor so as to maintain the orientation of said floor substantially constant as said floor is lowered during extension and raised during retraction.

5. The improvement of claim 4, wherein said follower includes a roller which rolls on said upper surface of said at least one rail and another roller which rolls on a lower surface of said floor.

6. In a support system for expanding and retracting a slide-out room of a recreational vehicle, said room having a floor which in an expanded position of the room is at substantially the same level as a stationary floor of the vehicle and in a retracted position of the room is above the stationary floor of the vehicle, said support system including at least one extendable and retractable rail fixed to the room for expanding and retracting the room, rollers for supporting the at least one rail relative to a fixed support and a drive system for moving the at least one rail in and out, the improvement wherein, with said room in said extended position, said system has at least one downwardly facing ramped surface adjacent an inner end of said at least one rail and another downwardly facing ramped surface spaced toward the outer end of said at least one rail from said one ramped surface, wherein said drive system is connected to each said at least one rail to extend and retract said at least one rail and wherein said rollers roll on said ramped surfaces to support each said at least one rail, wherein both of said ramped surfaces are ramped in a direction and positioned so as to lower each said at least one rail as said rollers roll on said ramped surfaces while maintaining a generally horizontal orientation of each said at least one rail as said at least one rail is extended and to raise each said at least one rail while maintaining a generally horizontal orientation of said at least one rail as said at least one rail is retracted, wherein said drive system is a rack and pinion drive system which drives an elongated member which is pivotally connected to said at least one rail.

7. In a support system for expanding and retracting a slide-out room of a recreational vehicle, said room having a floor which in an expanded position of the room is at substantially the same level as a stationary floor of the vehicle and in a retracted position of the room is above the stationary floor of the vehicle, said support system including at least one extendable and retractable rail fixed to the room beneath the room for expanding and retracting the room, rollers for supporting the at least one rail relative to a fixed support and a drive system for moving the at least one rail in and out, the improvement wherein, with said room in said extended position, said system includes a first pair of downwardly facing ramped surfaces in registration with one another on opposite sides of said at least one rail adjacent an inner end of said at least one rail and a second pair of downwardly facing ramped surfaces spaced toward the outer end of said at least one rail from said first pair of ramped surfaces, said ramped surfaces of said second pair being on opposite sides of said at least one rail and in registration with one another, wherein said drive system is connected to each said at least one rail to extend and retract said at least one rail and wherein said rollers roll on said ramped surfaces to support each said at least one rail, wherein both of said pairs of ramped surfaces are ramped in a direction and positioned so as maintain a substantially constant orientation of each said at least one rail as said at least one rail is lowered during extension and raised during retraction.

8. The improvement of claim 7, wherein one of said pairs of ramped surfaces is stationary and said other pair of ramped surfaces is fixed to the adjacent at least one rail so as to move with said at least one rail.

9. The improvement of claim 7, wherein a follower is positioned between an upper surface of said at least one rail and said floor of said moveable room, said follower maintaining a constant spacing between said upper surface and said floor so as to maintain a substantially constant orientation of said floor as said floor is lowered during extension and raised during retraction.

10. The improvement of claim 9, wherein said follower includes a roller which rolls on said upper surface and another roller which rolls on said floor.

11. The improvement of claim 7, wherein said drive system is a rack and pinion drive system which drives an elongated member which is pivotally connected to said at least one rail.

12. In a support system for expanding and retracting a slide-out room of a recreational vehicle, said room having a floor which in an expanded position of the room is at substantially the same level as a stationary floor of the vehicle and in a retracted position of the room is above the stationary floor of the vehicle, said support system including at least one extendable and retractable rail fixed to the room for expanding and retracting the room, rollers for supporting the at least one rail relative to a fixed support and a drive system for moving the at least one rail in and out, the improvement wherein, with said room in said extended position, said system includes at least one downwardly facing ramped surface adjacent an inner end of said at least one rail and another downwardly facing ramped surface spaced toward the outer end of said at least one rail from said one ramped surface, wherein said drive system is connected to each said at least one rail to extend and retract said at least one rail and wherein said rollers roll on said ramped surfaces to support each said at least one rail, wherein both of said ramped surfaces are ramped in a direction and positioned so as to maintain a substantially contant orientation of each said at least one rail as said at least one rail is lowered during extension and raised during retraction, and wherein each said at least one rail has a flat top surface and a follower is supported on said top surface as said at least one rail is extended and retracted, said follower supporting said floor so that said floor is maintained in a substantially constant orientation as said floor is lowered and raised, wherein said ramped surfaces are adjacent to sides of said at least one rail.

13. The improvement of claim 12, wherein stationary and said other ramped surface is fixed to said at least one rail so as to move with said at least one rail.

14. In a support system for expanding and retracting a slide-out room of a recreational vehicle, said room having a floor which in an expanded position of the room is at substantially the same level as a stationary floor of the vehicle and in a retracted position of the room is above the stationary floor of the vehicle, said support system including at least one extendable and retractable rail fixed to the room for expanding and retracting the room, rollers for supporting the at least one rail relative to a fixed support and a drive system for moving the at least one rail in and out, the improvement wherein, with said room in said extended position, said system includes at least one downwardly facing ramped surface adjacent an inner end of said at least one rail and another downwardly facing ramped surface spaced toward the outer end of said at least one rail from said one ramped surface, wherein said drive system is connected to each said at least one rail to extend and retract said at least one rail and wherein said rollers roll on said ramped surfaces to support each said at least one rail, wherein both of said ramped surfaces are ramped in a direction and positioned so as to maintain a substantially contant orientation of each said at least one rail as said at least one rail is lowered during extension and raised during retraction, and wherein each said at least one rail has a flat top surface and a follower is supported on said top surface as said at least one rail is extended and retracted, said follower supporting said floor so that said floor is maintained in a substantially constant orientation as said floor is lowered and raised, wherein one pair of said ramped surfaces are on opposite sides of the at least one rail at an inner end of the at least one rail and another pair of ramped surfaces are on opposite sides of the at least one rail spaced from said one pair of ramped surfaces toward said outer end of said at least one rail, with rollers rolling on all of said ramped surfaces to support said at least one rail in a substantially constant orientation as said at least one rail is lowered as it is extended and raised as said at least one rail is retracted.

15. The improvement of claim 14, wherein said one pair of ramped surfaces are stationary relative to the fixed support and said other pair of ramped surfaces are fixed to said at least one rail so as to move with said at least one rail, and wherein rollers are provided on said at least one rail which roll on said one pair of ramped surfaces and rollers are provided on said fixed support which roll on said other pair of ramped surfaces.

16. In a support system for expanding and retracting a slide-out room of a recreational vehicle, said room having a floor which in an expanded position of the room is at substantially the same level as a stationary floor of the vehicle and in a retracted position of the room is above the stationary floor of the vehicle, said support system including at least one extendable and retractable rail fixed to the room for expanding and retracting the room, rollers for supporting the at least one rail relative to a fixed support and a drive system for moving the at least one rail in and out, the improvement wherein, with said room in said extended position, said system includes at least one downwardly facing ramped surface adjacent an inner end of said at least one rail and another downwardly facing ramped surface spaced toward the outer end of said at least one rail from said one ramped surface, wherein said drive system is connected to each said at least one rail to extend and retract said at least one rail and wherein said rollers roll on said ramped surfaces to support each said at least one rail, wherein both of said ramped surfaces are ramped in a direction and positioned so as to maintain a substantially contant orientation of each said at least one rail as said at least one rail is lowered during extension and raised during retraction, and wherein each said at least one rail has a flat top surface and a follower is supported on said top surface as said at least one rail is extended and retracted, said follower supporting said floor so that said floor is maintained in a substantially constant orientation as said floor is lowered and raised, wherein said follower includes a roller which rolls on said upper surface of said at least one rail and another roller which rolls on said floor.

17. In a support system for expanding and retracting a slide-out room of a recreational vehicle, said room having a floor which in an expanded position of the room is at substantially the same level as a stationary floor of the vehicle and in a retracted position of the room is above the stationary floor of the vehicle, said support system including at least one extendable and retractable rail fixed to the room for expanding and retracting the room, rollers for supporting the at least one rail relative to a fixed support and a drive system for moving the at least one rail in and out, the improvement wherein, with said room in said extended position, said system includes at least one downwardly facing ramped surface adjacent an inner end of said at least one rail and another downwardly facing ramped surface spaced toward the outer end of said at least one rail from said one ramped surface, wherein said drive system is connected to each said at least one rail to extend and retract said at least one rail and wherein said rollers roll on said ramped surfaces to support each said at least one rail, wherein both of said ramped surfaces are ramped in a direction and positioned so as to maintain a substantially contant orientation of each said at least one rail as said at least one rail is lowered during extension and raised during retraction, and wherein each said at least one rail has a flat top surface and a follower is supported on said top surface as said at least one rail is extended and retracted, said follower supporting said floor so that said floor is maintained in a substantially constant orientation as said floor is lowered and raised, wherein said drive system is a rack and pinion drive system which drives an elongated member which is pivotally connected to said at least one rail.

* * * * *

UNITED STATES PATENT AND TRADEMARK OFFICE
CERTIFICATE OF CORRECTION

PATENT NO. : 6,619,714 B2
DATED : September 16, 2003
INVENTOR(S) : Robert H. Schneider et al.

It is certified that error appears in the above-identified patent and that said Letters Patent is hereby corrected as shown below:

<u>Column 4,</u>
Line 65, "10" should be -- 110 --.

<u>Column 8,</u>
Line 51, "wherein stationary" should be -- wherein said one ramped surface is stationary --.

Signed and Sealed this

Twenty-seventh Day of January, 2004

JON W. DUDAS
*Acting Director of the United States Patent and Trademark Office*